Jan. 4, 1955
G. W. ZABEL
2,698,468
MOLD CONVEYING AND HANDLING APPARATUS
Original Filed Nov. 1, 1947
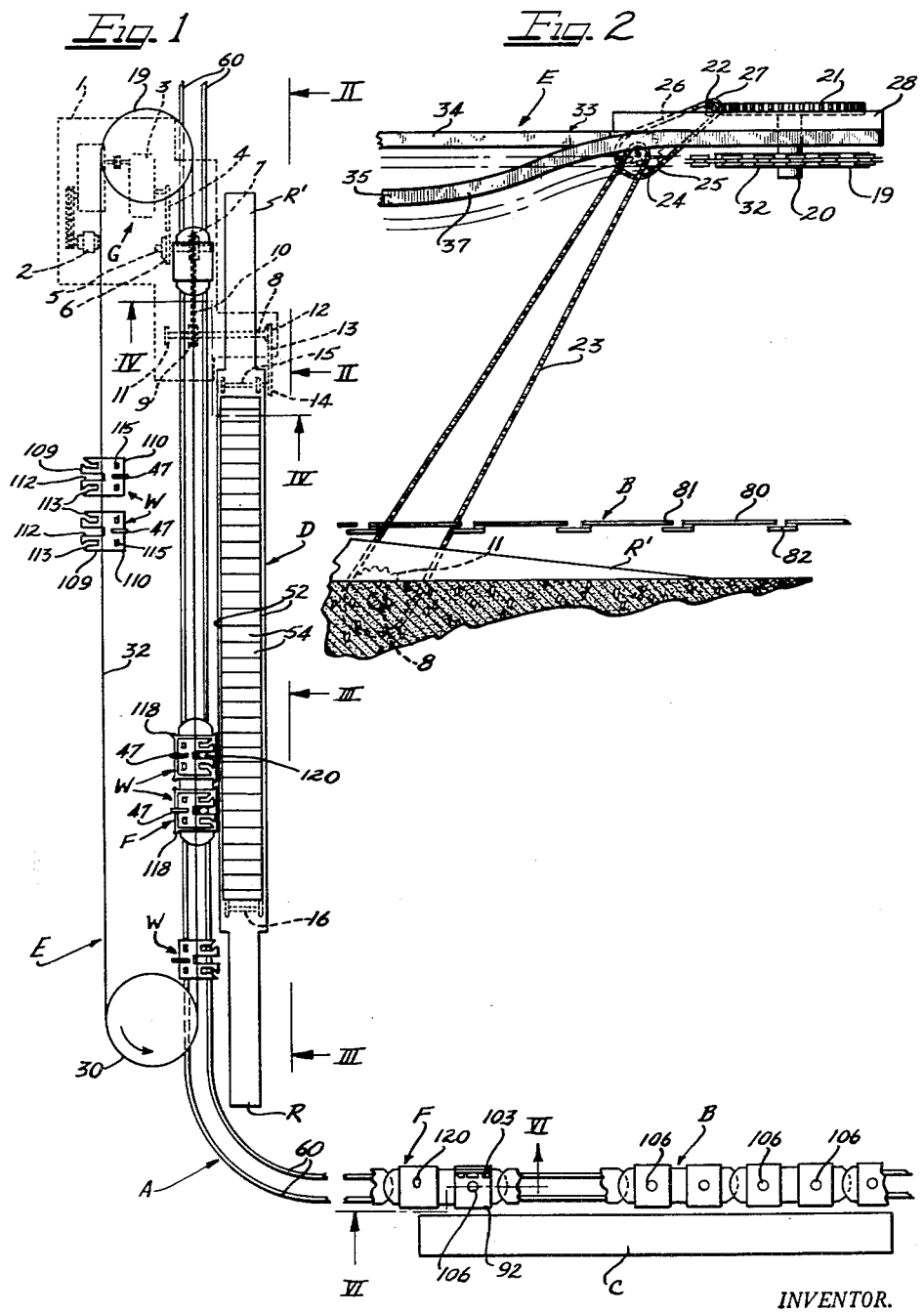
INVENTOR.
GEORGE W. ZABEL
BY
Paul L. Krober
ATTY.

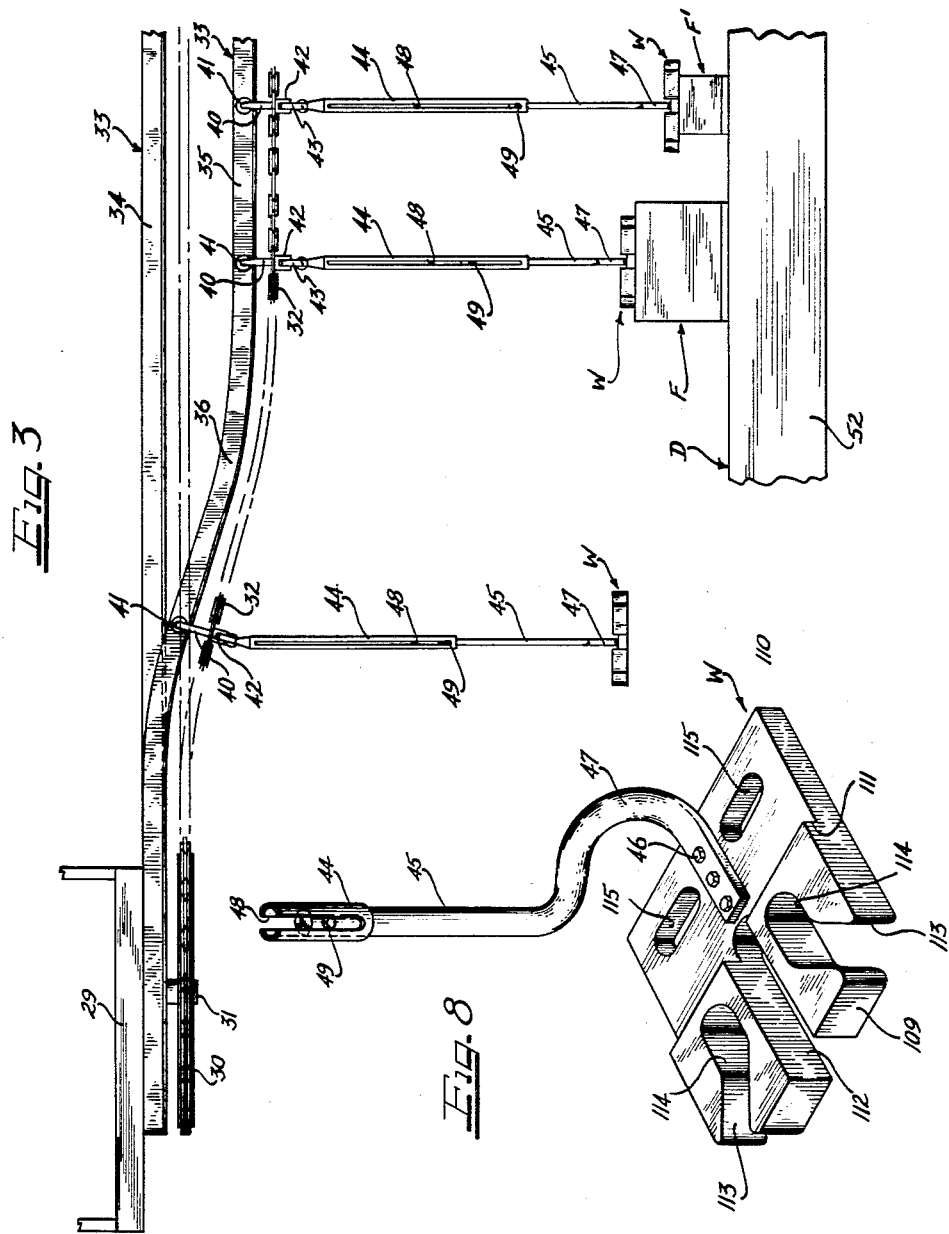

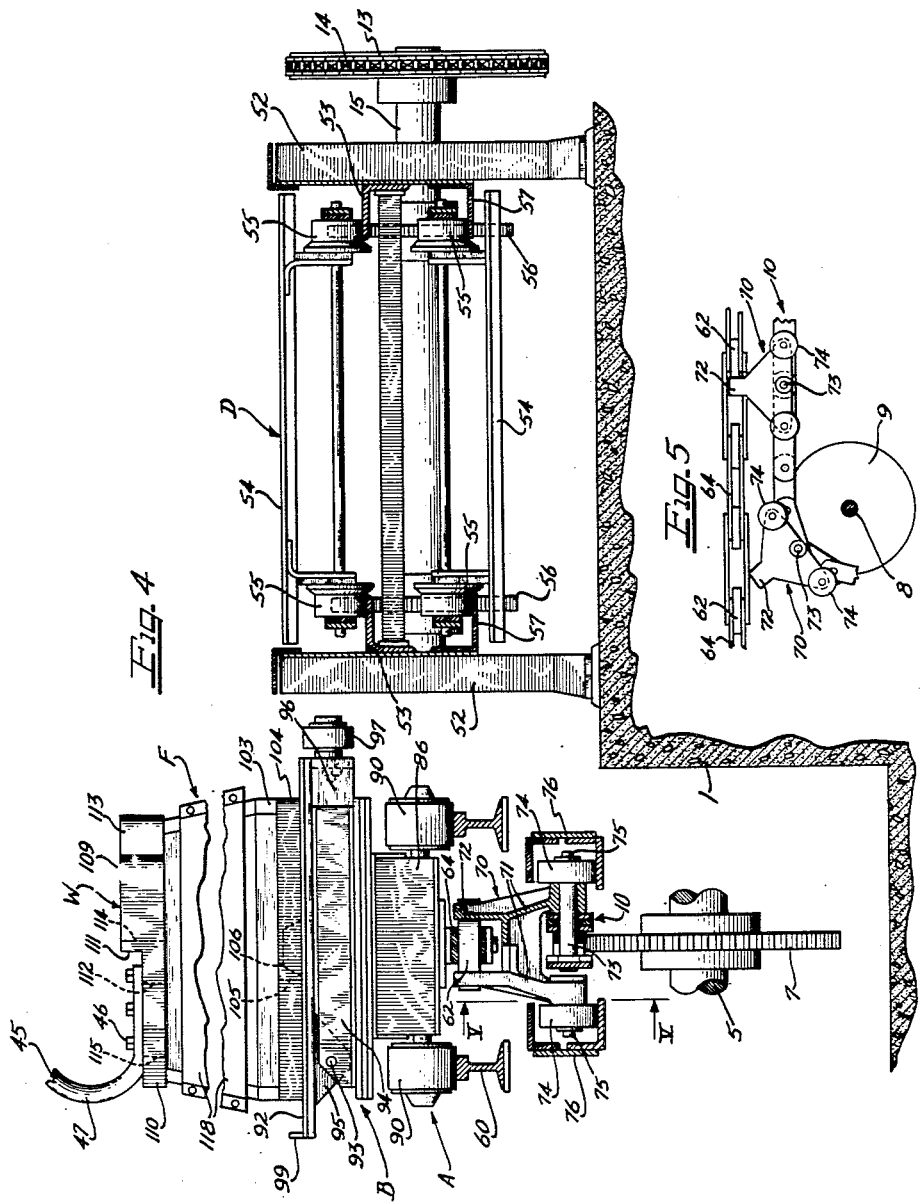

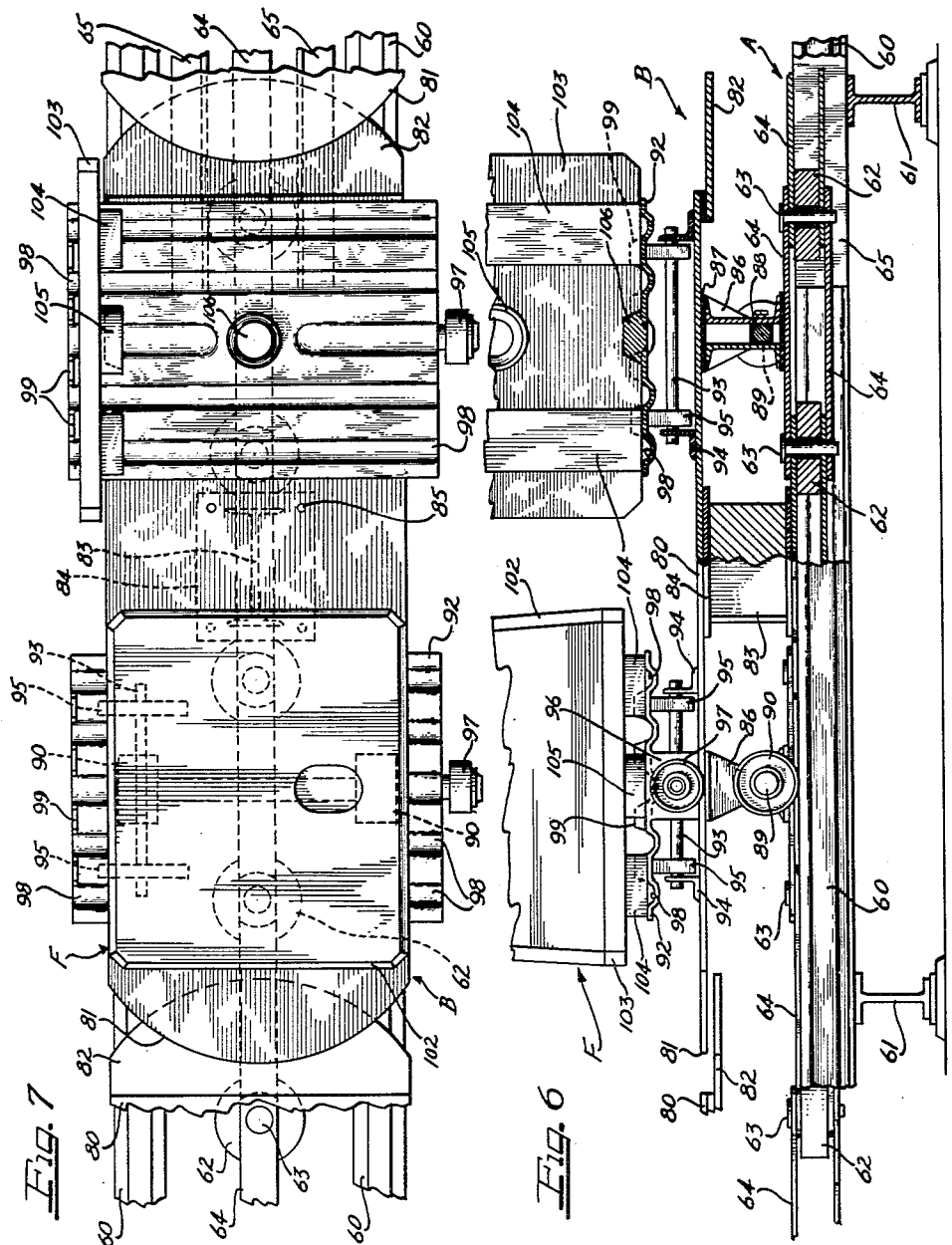

United States Patent Office

2,698,468
Patented Jan. 4, 1955

2,698,468

MOLD CONVEYING AND HANDLING APPARATUS

George W. Zabel, Beloit, Wis., assignor to Fairbanks, Morse & Co., Chicago, Ill., a corporation of Illinois Original application November 1, 1947, Serial No. 783,571, now Patent No. 2,601,199, dated June 17, 1952. Divided and this application May 13, 1952, Serial No. 287,489

2 Claims. (Cl. 22—112)

This invention relates to conveying equipment for use in connection with shop molding and the like, and is particularly directed to certain improvements in the construction of an endless conveyor provided with mold supporting carriages, in the arrangement of a mold weight conveyor, and in the provision of means for driving the conveyors in synchronism whereby the mold pouring operation may be carried out to best advantage.

Particularly important provisions disclosed herein are to be found in the improved construction and arrangement of conveyor carriages for receiving and locating the respective molds in proper relation whereby mold weights may be deposited thereon prior to pouring of the mold, and in the provision of means for moving the molds and weights into cooperative registering positions in a synchronous manner such that rapid pouring may be accomplished and a high rate of production obtained thereby.

An important feature of this invention resides in the provision of a conveyor on which an operator is carried and from which he can pour molten metal into a mold which is traveling on an adjacent, speed synchronized conveyor.

Other objects, features, advantages and improvements included within the intended scope of this invention will be particularly pointed out in connection with the detailed description hereinafter to be given in view of the accompanying drawing disclosure of a preferred, but not necessarily the only embodiment which the invention may have.

The present application is a division of my copending application, Serial Number 783,571, filed November 1, 1947, now Patent No. 2,601,199.

In the drawing:

Fig. 1 is a somewhat fragmentary and schematic plan view of the conveyor system which embodies the particular features and improvements of the invention;

Fig. 2 is a fragmentary elevational view of the drive provisions for the mold weight conveyor means as seen at line 2—2 in Fig. 1;

Fig. 3 is a further fragmentary elevational view of the mold weight conveyor, and mold conveyor wherein the adaptability of the weights to various sizes of molds is shown to advantage, this view being seen at line 3—3 in Fig. 1;

Fig. 4 is a transverse elevational view, partly in section, of the conveyor and conveyor drive as seen in the zone of the pouring station, the view being particularly taken at line 4—4 in Fig. 1;

Fig. 5 is a fragmentary view of the means for driving the mold conveyor, the view taken along line 5—5 in Fig. 4;

Fig. 6 is a detailed and partly sectional view, in elevation, of a typical mold conveyor carriage in which certain important features of the invention are shown, this view being indicated as taken along line 6—6 in Fig. 1;

Fig. 7 is a plan view of the detailed disclosure showing of Fig. 6; and

Fig. 8 is a perspective view of a typical mold weight and weight hanger assembly as herein preferred.

The presently preferred character of shop molding and conveying equipment to which my improvements pertain is primarily directed to a continuous and high production shop activity. In a shop installation of this type, the usual practice requires a large number of duplicate parts so that continuity of production may be held to the most efficient schedule. This involves, in some cases, an almost prohibitively high first cost for equipment, parts and the like. My invention aims to effect certain important improvements connected with a shop process of this general nature, and includes provisions and facilities for assuring uniformity of the various manual activities required to be performed at each of the designated stations along the conveyor line of travel, provisions for permitting the selective use of the equipment for the molding of a number of articles having size and form variations, and provisions for effecting a considerable reduction in the number of accessories by adoption of standard and interchangeable accessories.

Briefly, I have disclosed in Fig. 1 a part only of an endless type conveyor A having an appropriate number of carriage assemblies B arranged in end-to-end adjacence; a conveyor carriage loading station C extending along side the line of conveyor travel and spaced from a mold pouring station which is represented by a moving walkway or horizontally directed escalator assembly D including a pair of stationary ramps R and R' for mounting and leaving the same; a conveyor system E for the movement of mold weights into and out of cooperation with the molds F supported on the carriages B of the conveyor; and a power assembly G which includes a driving motor, speed gears and sprocket and chain transmission means adapted to effect a simultaneous and synchronous movement of the conveyor A, escalator D and weight conveyor system E.

The power assembly G (Fig. 1) is, for the most part, contained in a suitable floor pit 1 and embodies an electric motor 2 belt connected to a speed reduction gear assembly 3 from which power is taken on the sprocket chain 4 to a main power shaft 5. This shaft 5 carries a drive sprocket wheel 6 at one end and a sprocket wheel 7 intermediate its bearing supports. The sprocket 7 is located in the center line of the conveyor such that the latter may have driving connection therewith as will later appear. A second shaft 8 parallel to but spaced from shaft 5 carries the companion sprocket wheel 9 for the conveyor drive sprocket 7 and between which the sprocket chain 10 operates. This shaft 8 also carries a drive sprocket wheel 11 for the weight conveyor E and a drive wheel 12 from which the chain 13 extends for driving the escalator wheel 14, the latter being secured to the shaft 15 of the escalator drive means. The opposite end of the escalator D is provided with an idler assembly 16 which is similar to the means 15.

Referring now to Figs. 2 and 3, I have shown portions of the weight conveyor system E. This system includes (Fig. 2) a drive wheel 19 suitably keyed to the lower end of a vertically directed shaft 20, a worm gear 21 secured to the upper end of shaft 20 and arranged to be engaged by the worm element 22, and power transmission means extending between the element 22 and drive sprocket wheel 11 on shaft 8. This transmission means may comprise a sprocket chain 23 engaging wheel 11 on shaft 8 and a smaller sprocket wheel 24 fixed on a counter shaft adjacent a larger sprocket wheel 25 utilized for driving a second chain 26, the latter engaging with a worm drive sprocket wheel 27. Thus power transmitted to the shaft 8 located in the floor pit will be imparted to the worm gear 21 and shaft 20 for driving the conveyor wheel 19. A suitable supporting frame structure 28 is provided for the wheel 19, and its associated drive means, and this may be tied in with portions of the building structure (not shown). In Fig. 3, I have shown a second supporting structure 29 from which is suspended an idler wheel 30 suitable secured to a vertically set shaft 31. Each of these wheels 19 and 30 engaged with an endless chain 32 to move the same in a path determined by the contour of a rigid track structure 33 suitably fixed to the supports 28 and 29 and to a plurality of intermediate supports (not shown). The track 33 provides a return path of movement for the mold weights which is substantially level or horizontal from wheel 19 toward wheel 30 as indicated by the rearward track portion 34 which is remote from the line of movement of the conveyor A. The forward path defined by the track from a zone adjacent wheel 30 toward a zone adjacent wheel 19 is also substantially level but at a lower elevation as at 35. The transition from the higher level return track section 34 to the lever level forward track section 35 occurs at the zone of declivity 36 which is located (Fig. 3) adjacent the wheel 30 and at the initial stage where the track attains its registry vertically above or over the center line of the conveyor A. The constant elevation portion 35 of the track then extends over a considerable span of the conveyor A and preferably coincident with the effective length of the moving escalator D. The reverse transition from the lower to the higher level track sections occurs at a zone of acclivity 37 (Fig. 2) which defines the final stage of track registry over the conveyor A.

Track 33 functions as a guide for the mold weights W (Figs. 1, 3 and 8) and the weight supporting means, only a single example thereof being shown in Fig. 3. The individual hanger supporting means for the mold weights W comprises a hanger arm 40 having its upper end suitably formed to engage a track roller 41, the latter roller engaging in the track flanges in the usual manner. Each hanger arm 40 carries a yoke-type fitting 42 at its lower end portion, and this fitting is pivotally connected to the link 43 also pivotally attached at the upper end of the hanger sleeve 44 such that the yoke and link will allow the hanger sleeve 44 to swing in directions in line with and transversely of the track 33. The endless chain 32 of the weight conveyor system is connected to the hanger arm 40 as by projection of the arm through a chain link provided for that purpose. It will, of course, be understood that a plurality of mold weights will be suspended from the track 33 in the desired spacing, and that each weight W will be supported by the means described in connection with Fig. 3.

In reference to Fig. 8, each of the weights W is provided with a rod 45 which is rigidly attached thereto by bolts 46. The rod 45 is suitably curved in the end portion 47 to extend rearwardly of the weight body and upwardly such that its upper straight portion is positioned in or close to the center of the mass for suspending the same in a substantially level attitude. The upper end of this rod 45 is telescopically received in the lower end of the hanger sleeve 44 and may move therein to increase or decrease the effective length of the combined sleeve and rod assembly within certain limits. As shown, the sleeve 44 is provided with a longitudinally directed through slot 48 which extends from a point close to its lower end to a desired point at its upper end. The rod 45 is provided with a transverse pin 49 for engaging in this sleeve slot 48 to prevent complete withdrawal of the rod 45 from the sleeve 44. In this manner, the rod is adapted to slide in the sleeve for elevational adjustments of the weight W, but is prevented from rotating relative thereto. The telescopic nature of the sleeve and rod type weight hanger permits the weight to assure a position with its full weight resting on the mold. This weight positioning action occurs (Fig. 3) regardless of whether the mold F is relatively small or large, with regard to its vertical height as measured from the top plane of the conveyor carriage B. As the weight W is deposited on the mold F, due to the fact that the forward track portion 35 is at a lower elevation than the return track portion 34, the sliding relation between sleeve 44 and rod 45 will automatically effect the full weight deposit upon such mold, as by the movement of rod 45 into the sleeve 44 such that the pin 49 moves away from its contact at the lower end of the slot 48.

Proceeding further and with reference to Figs. 1 and 4, the escalator assembly D is located parallel to and at the side of the conveyor A which is opposite the location of the weight conveyor system E. Assembly D comprises elongate side frame structures 52 supported from suitable floor footings (Fig. 4), and each side frame is provided with an upper horizontally extending track member 53 upon which the several tread plates 54 move as by the tread plate rollers 55. As each tread plate 54 passes downwardly over the drive sprockets 56 fixed on drive shaft 15 adjacent the down ramp R' for return to the opposite, entering end of the escalator at up-ramp R, the rollers 55 are engaged by return tracks 57 for guidance in a generally horizontal direction beneath the upper pass of tread plates. The construction of escalator assembly D is generally conventional, and forms, per se, no part of the present improvements.

The construction of the mold conveyor system A may be seen in Figs. 1, 4, 6 and 7. In general, this conveyor includes a pair of spaced and parallel tracks 60 which are supported from the floor upon a plurality of cross ties, 61, two such ties being shown in Fig. 6. A roller and link chain is strung between these tracks and receives its support from the carriage B as will appear presently. The chain is made up of a series of rollers 62 having vertical pin shafts 63 to which the link bars 64 are pivotally connected. These bars 64 are disposed in the chain in vertically spaced pairs, with alternate underlapping and overlapping pairs as is shown in Fig. 6. This chain, during its movement between the fixed tracks 60, is maintained against lateral movement by suitably arranged guide rails 65 between which the chain rollers 62 may move. Although only a fragmentary portion of the guide rails 65 have been shown in Figs. 6 and 7 at the right hand of the views, it will be obvious that these rails will be installed at all of the critical zones of the conveyor system A, such as the curved portions of the track, the loading station C and along the length of the escalator assembly D.

Presently preferred means for driving the conveyor chain (Figs. 4 and 5) includes the sprocket wheel 7 on the driven shaft 5, the wheel 7 engaging with the sprocket chain 10 for moving the latter in conjunction with the idler sprocket wheel 9 carried on shaft 8 (Figs. 1 and 5). The chain 10 carries at suitably spaced intervals (Figs. 4 and 5) dog members 70 which comprise matching castings 71 provided with projections 72 for engaging one at each side of the rollers 62 of the conveyor chain. As shown in Fig. 5, these dog members 70 are spaced along the length of the sprocket chain 10 so as preferably to engage every other one of the rollers 62 on the drive chain for the conveyor A. Each of the castings 71 is pivoted from its central base portion upon a pivot element 73 of the sprocket chain 10, and at each side of this central pivot connection, that is in the longitudinal direction of the chain 10, there is provided a roller 74 mounted on a shaft element 75. Thus each casting 71 of the matching pairs has a projection 72 and a pair of rollers 74, the latter serving to maintain the dog member 70 in proper position as by rolling cooperation in the guide tracks 76 at each side of the line of travel thereof. These guide track assemblies 76 are supported upon the floor in any suitable manner (not shown) while the sprocket chain, sprocket wheels and shafting is positioned for operation in a part of the floor pit 1 therebelow.

With particular reference to Figs. 4, 6 and 7, there is shown a typical construction and arrangement of conveyor carriage B which is adapted to receive, center and move molds F along the conveyor A from the loading station C, through the zone of mold pouring at escalator D and to zones of cooling, treating, unloading and the like, (not shown) prior to return to loading station C. The typical carriage B comprises an elongate table 80 having a somewhat semicircular leading edge 81 and a similarly shaped but attached apron or trailing end plate 82 which underlaps the next adjacent edge 81 of the following carriage table 80. This construction permits relative angular alignment of the respective carriage assemblies B without uncovering the drive chain of the conveyor A, affords a safeguard against a shop worker becoming entangled in the conveyor, and protects the conveyor against falling objects which might de-rail a carriage B. The table 80 is secured upon the upper end of a central supporting column 83, as by riveting the same to the bearing plate 84 of this column at a plurality of points indicated by the rivet elements 85. Column 83 is fixed to the upper one of the chain links 64 (Fig. 6) and between the adjacent rollers 62 spanned thereby. This column, thus, provides the principal means of attaching the carriage B to the drive chain of conveyor A. At the leading and trailing ends of the central column 83, there is provided substantially identical support columns 86, and these columns are secured to the upper ones of the chain links 64 located respectively ahead of and behind the link 64 upon which column 83 is fixed. Each column 86 is provided with an upper bearing plate 87 for sliding engagement with the under surface of the carriage table 80 whereby to permit relative lateral movement between the columns 86 and the table 80 as the drive chain deviates from a straight line path as permitted by the vertically directed pins 63 of the chain. The lower end of each of these columns 86 affords support for a bearing block 88 on the opposite ends of which are formed or suitably machined axle elements 89 to carry roller means 90. Each block 88 thus mounts a pair of rollers 90, and these rollers are spaced apart to engage on the tread surface of conveyor tracks 60 and transmit substantially all of the weight of the carriage B and its load to the tracks. In this manner, the drive chain of the conveyor A is freed of any vertical loading but acts to move the respective carriages B through the connection afforded by central column 83.

In the present embodiment, each carriage table 80 is made large enough to carry a pair of molds F (one only being shown in Figs. 6 and 7). To carry out this feature and as an aid to the automatic unloading or dumping of the molds at a predetermined station along the conveyor, there is operatively mounted on each table 80 a pair of dumping trays 92 which are pivotally mounted on the shaft 93 secured at one longitudinal side of the table 80. The shaft 93 for each tray 92 is supported in spaced angle brackets 94 fixed on the table 80 while depending and spaced lugs 95 fixed on the under surface of the tray engage the shaft. The opposite side of each tray 92 from the location of the pivoted lugs 95 is provided with a foot block 96 bearing on the table 80 to retain the tray in a level position. The foot block 96 forms a bearing for the projecting roller 97 and affords through the roller an actuating device for engaging with the tray dumping device (not shown). Thus each tray 92 is free to pivot in a direction transversely of the carriage B and at one side of the table 80 (See Fig. 4). By preference, each tray 92 is of integral cast construction with its planar surface suitably corrugated or fluted at 98 and provided with a plurality of spaced marginal flanges 99 at the side adjacent the pivot lugs 95.

The molds F, usually comprising a former or cope 102 for holding the sand in proper condition as it comes from the sand shop (Fig. 6), is placed on a mold pallet 103, and this pallet with the cope is then placed upon the tray 92 at the loading station C. Each pallet 103 is provided with foot blocks 104 at each side of the center to facilitate its handling during loading and otherwise, and of more particular importance is provided at its center with a centering means 105 in the form of an inverted cup element having an internal conical surface. Correspondingly, the tray 92 has a conical projection 106 cast or otherwise provided in the center of its upper face. The conical surface of projection 106 is made exactly to match with the internal surface of and receive thereover the cup element 105 of the pallet. The centering means 105 and matching projection 106 is clearly disclosed in Figs. 6 and 7 wherein the right hand portion of these views illustrates the pallet 103 raised to a vertical position on the tray 92 and the left hand portion shows the normal cooperating position thereof for centering the pallet 103 on the tray 92 to bring the mold F into a centered position on the carriage B. Having thus provided means for centering each pallet, it will be a comparatively simple matter to line up the pallet on the tray by turning the pallet until the pallet foot blocks 104 are substantially parallel to the adjacent margins of the tray (Fig. 6). It should be noted that the cup elements 105 are made to fit with any of the tray projections 106 for interchangeable mounting of the pallets.

In shop molding equipment of this character, it is highly desirable to be able to cast a plurality of different objects more or less at random, without resorting to the more usual production practice of running a single type of article or object through the line before changing to a second type. The random casting of various articles greatly increases the productivity of a shop and lessens the problem of accessory change over to meet each new run of articles.

I have accomplished this usually difficult problem by the above described synchronized conveyor system wherein, the molds are brought to the pouring station, the mold weights are automatically deposited upon and later removed from the molds after pouring, and wherein the actual step of pouring the metal is performed while the molds are in motion. The last step, of pouring the metal is made possible by the use of an escalator having a movement timed to that of the molds so that the ladle man standing on the escalator is carried along as the metal is poured into the mold.

In random molding procedure as above noted, it is clear that each series of molds for the different articles may have a different location for the pouring gate, depending upon the shape of the article and the best location for the pouring gate to enable a rapid and complete filling of all the mold cavities. Despite the many variations and possible locations for the pouring gate, I have determined that the variations in location of the mold pouring gate from article to article may be made to conform to a definite pattern, without impairing the qualities of the finished article, or the ease and rapidity with which the pouring may be carried out. Any molding shop can, by careful study of the many articles being cast, arrive at and substantially determine the pattern of locations formed by the pouring gates as they vary from one mold to the next. As a consequence thereof, it will then be possible to select a standard type of weight to be used with all of the molds, and wherein the weight will have a pattern of openings, cut-outs or the like to match the predetermined pattern of pouring gate location.

Such a mold weight W is disclosed in Fig. 8, as well as in other views hereof but it is to be understood that I do not intend to be limited to the precise form of weight W which is shown. Thus the presently preferred weight W is formed of a block of suitable metal which has a substantially flat bottom surface, a thickened portion, 109 and a thin portion 110 disposed substantially on opposite sides of a transverse median line defined by the shoulder 111 separating these block portions. This graduated thickness of the weight block W affords a balancing of the mass so that it will remain in a horizontal position when hanging free. The degree of thickness variation between the two portions 109 and 110 is of course, related with the number and size of the several cut-outs or openings formed therein. In the present weight W, I have provided a central notch 112 extending through the thick portion and into the thin portion beyond the shoulder 111 so that the inner zone of the notch will extend into the central area of the mold F to be weighted down thereby. At each side of the rectilinear notch 112, there is formed an angulate notch having an entrance section 113 directed at a convergent angle with notch 112 and a connecting inner section 114 directed substantially parallel with the notch 112. In the relatively thin portion 111 of the weight W, there are formed spaced openings 115 having the major axis or length thereof directed normally to the lengthwise dimension of the notch 112. Accordingly, the improved weight W is formed with a substantially symmetrical pattern of cut-outs, notches, slots, openings or the like, and these are so arranged as to be capable of matching the variations in mold pouring gate locations whereby casting metal may be introduced to the molds through at least one thereof without need for any preliminary shifting of the weight once it has been deposited on the top surface of the mold.

The operation of my improved equipment is initiated upon starting of the main drive motor 2, this will through the reduction gearing 3 and sprocket chain 4 start operation of the conveyor A, weight conveyor E and escalator D by means of the several interconnected sprockets and chains before described. Since each of these moving units of the system have a common source of motive power, it follows that the synchronism thereof can be determined by proper selection of the sprocket wheel sizes. For the example shown, I have selected as most suitable for the normal or average shop a possible speed range of from 6 to 24 feet per minute. Thus each of the three moving units will have the same speed range and will at all times maintain a synchronized speed so that the carriages B with the molds F thereon will move into the path of travel of the weights W on conveyor E at the same speed imparted to the weight, and the escalator D will also move at the same speed whereby to transport the ladle man right with the mold selected for pouring.

With the system in operation, the molds F, previously made up and deposited at station C, are placed upon the conveyor carriages so that the mold pallet cup 105 is received upon the conical centering projection 106 of the tray 92. The pallet 103 may then be squared up with the tray 92 to bring the mold into proper position. However, the biggest difficulty heretofore encountered, in effecting a centering of the molds upon the carriages has been effectively eliminated by the use of the improved centering means 105 and 106. As each loaded carriage B moves out of the loading station C, the former or cope 102 is removed and a retainer frame 118 (Figs. 1 and 4) comprising side plates having corner flanges for bolted securement is placed about the mold. This step is performed before the carriage moves into its line of travel parallel with the escalator D. The copes 102 may then be returned to the molding room for use with subsequent molds, without having to run the full circuit of conveyor A.

The mold with its retainer frame 118 then is moved into the pouring station adjacent the escalator D and during the first stages of travel therein a weight W moves thereover and descends along the descending track section 36 (Fig. 3) whereby the weight is deposited on the mold. In the view of Fig. 3, I have illustrated the situation where different molds F and F' are carried along together, the mold F' being the smaller one as to its height above the surface of the carriage. Thus the leading weight W will have to drop to a lower level than the trailing weight W and this is fully provided for by the type of weight suspension means 44 and 45 before noted. It is further to be noted that the suspension means, due to the curved portion 47 of the rod 45, is clear of the upper surface of the weight W (Fig. 4) so as not to obstruct the area of pouring operation as a ladle is brought to the pouring position by a ladleman standing upon the escalator tread plates 54.

It is also to be noted that the rods 45 and the sleeves 44 move downwardly in a vertical plane which passes through the path of travel of the molds. Thus, no matter how much the sizes of the molds vary, the weight will always be moved directly down onto the mold. In previous mold-weighting devices the weight-carrying apparatus was positioned at the side of the mold conveyor and arranged to move the weight through an arcuate path downwardly toward the mold. With that arrangement, only one size mold received an accurately placed weight. The amount that the mold weight was off center on the other size molds depended upon the extent of arcuate travel of the mold weight before it reached the mold. With the overhead arrangement of this invention, each weight is accurately positioned on the mold regardless of the size of the mold.

The pouring operation for one or more molds may be completed during the time the molds have moved the length of the lowest section of the weight conveyor track 35, after which the rising track section 37 (Fig. 2) will effect weight removal for passage along the return high level track portion 34. The poured molds may then continue on around the circuit of conveyor A through the dumping station (not shown) and back to the loading zone C. It is particularly important in a system of this character, to bring the molds F and weights W into proper registry so as not to delay or make difficult the pouring of the casting metal. This is fully accomplished by the provision of my improved centering means 105 and 106, and by the novel formation of the weight W wherein notches, slots, openings and the like are provided for selective registry over the mold pouring gate.

In Fig. 1, I have shown a pair of molds F provided with identically located pouring gates 120, and, without unduly obscuring the drawing, it may be readily seen that the weights W are deposited thereon such that the gates 120 register with the central notches 112 of the weights.

It will now have appeared from the foregoing detailed description of the several units, assemblies and parts of my conveying equipment and mold handling means, that the present improvements will eliminate many of the difficulties attendant upon continuous molding operations, will reduce the quantity of accessories such as copes, frames and the like, required therefore, will permit the molding of a variety of articles in a generally random order of molding runs, and will greatly speed up the output of the articles by synchronous movement of the molds, mold weights and escalator platform from which the ladlemen operate during pouring.

I do not intend that the present disclosure of the preferred embodiment be taken as limiting my invention to the precise construction described, but wish it to be understood that all such modifications and rearrangements of which it is susceptible be included within the spirit and scope of the appended claims.

I claim as my invention:

1. In a foundry molding system, a mold conveyor provided for mold units which may vary in vertical dimension to an appreciable extent, said mold conveyor having a section defining a substantially straight line conveying path, a second conveyor having a conveyor track disposed in spaced relation above the straight line path of said mold conveyor and including a movable support member depending from said track, a sleeve pivotally mounted on said support member and extending downwardly therefrom, said sleeve having a longitudinal slot through one wall thereof with the lower end of the slot near the lower end of the sleeve, a rod disposed in telescoping relation in said sleeve, the lower end of said rod being adapted to project out of the lower end of the sleeve, a pin fixed on the upper end of the rod and extending through said slot, a weight secured on the lower end of the rod, said rod through engagement of said pin with the lower end of the slot, suspending the weight from the sleeve, and means including a depressed portion of said track for lowering said sleeve and rod together with said weight to effect deposit of the weight on a mold on said mold conveyor, the length of said slot being so chosen in relation to the distance between said conveyors and the lengths of said sleeve and said rod that in mold weight deposit on the underlying mold, said rod will be telescopically displaced upwardly in said sleeve to an extent dependent upon the vertical dimension of the mold and such that the entire load of said mold weight will be removed from said conveyor and concentrated on the mold.

2. In a foundry molding system providing a mold conveyor for movement of casting mold units through a pouring station, wherein the mold units may vary in vertical dimension, mold weight applying means for depositing and retaining mold weights on the mold units as they traverse said pouring station, said means comprising a mold weight conveyor arranged for movement through said pouring station in synchronism with mold conveyor movement of the mold units therethrough, a plurality of mold weights, and support means for suspension of each mold weight from said mold weight conveyor, said supporting means comprising a hanger sleeve carried by the mold weight conveyor in pivotal suspension therefrom and having an elongate longitudinally extending slot through the sleeve wall, a mold weight supporting rod extending in said sleeve and having a pin projecting in the slot of the sleeve, said rod extending below the sleeve to supporting connection with a mold weight and being displaceable telescopically relative to said sleeve, to permit distance adjustment of the mold weight below the mold weight conveyor for accommodating weight deposit on mold units of different vertical dimension, the rod in maximum extension from said sleeve with its pin engaging the lower end of the sleeve slot, suspending the mold weight from the sleeve, said mold weight conveyor in synchronous movement with the mold conveyor movement of mold units through said pouring station, depositing mold weights in weighting engagement upon the mold units, with the telescopically related hanger sleeve and rod of each deposited mold weight in relative displacement effecting said distance adjustment to accommodate the vertical dimension of the underlying mold unit, and each said rod and sleeve in relative displacement upon weight deposit on a mold, conditioning the associated mold weight such that the entire load of the weight then is concentrated on the underlying mold.

References Cited in the file of this patent

UNITED STATES PATENTS

| Number | Name | Date |
| --- | --- | --- |
| 501,331 | Doolittle | July 11, 1893 |
| 865,071 | Wood | Sept. 3, 1907 |
| 1,119,680 | Brown | Dec. 1, 1914 |
| 1,276,039 | Dosch | Aug. 20, 1918 |
| 1,731,897 | Hegarty et al. | Oct. 15, 1929 |
| 2,068,835 | Wurster | Jan. 26, 1937 |
| 2,095,151 | O'Connor et al. | Oct. 5, 1937 |
| 2,154,967 | Wurster | Apr. 18, 1939 |
| 2,467,374 | Hodes et al. | July 19, 1949 |